United States Patent [19]
Hyde

[11] Patent Number: 4,719,022
[45] Date of Patent: Jan. 12, 1988

[54] LIQUID LUBRICATING AND STABILIZING COMPOSITIONS FOR RIGID VINYL HALIDE RESINS AND USE OF SAME

[75] Inventor: Jeffrey R. Hyde, West Chester, Ohio

[73] Assignee: Morton Thiokol, Inc., Chicago, Ill.

[21] Appl. No.: 50,597

[22] Filed: May 14, 1987

Related U.S. Application Data

[63] Continuation-in-part of Ser. No. 808,038, Dec. 12, 1985, abandoned.

[51] Int. Cl.$^4$ ........................................... C10M 101/02
[52] U.S. Cl. ..................................... 252/35; 252/42.7; 252/46.4
[58] Field of Search ........................ 252/35, 42.7, 46.4

[56] References Cited

U.S. PATENT DOCUMENTS 3,640,828  2/1972  Brotz et al. ............................. 252/35
4,029,682  6/1977  Foulks, Jr. ............................. 252/35
4,566,982  1/1986  Habeeb et al. ......................... 252/35

Primary Examiner—Jacqueline V. Howard
Attorney, Agent, or Firm—Richard J. Sheridan; Gerald K. White

[57] ABSTRACT

Oils derived essentially from petroleum and which are liquids at ambient room temperature and meet a certain molecular weight/percent paraffin content parameter may be used as the only necessary external lubricants for rigid vinyl halide resin compositions when said oils are added to the resin compositions in sufficient quantity to permit satisfactory molding and extrusion of the resulting resin compositions. Such oils may also be employed to form liquid lubricating and stabilizing compositions for rigid vinyl halide resin formulations which lubricating and stabilizing compositions are liquids at ambient room temperature or at temperature of about 50° C. or less. Rigid resin compositions containing such oils and/or liquid lubricating and stabilizing compositions are readily prepared and easily processed.

32 Claims, No Drawings

LIQUID LUBRICATING AND STABILIZING COMPOSITIONS FOR RIGID VINYL HALIDE RESINS AND USE OF SAME

This is a continuation-in-part of application Ser. No. 808,038, filed Dec. 12, 1985, now abandoned.

FIELD OF THE INVENTION

This invention relates to liquid additives for vinyl halide resins and to resin compositions containing same. More particularly, the invention relates to additives for such resins which additives and additives formulations are liquid at generally normal ambient room temperature. This invention also relates to a method of incorporation such liquid additives and liquid additive formulations into resin compositions and to processing of same.

BACKGROUND OF THE INVENTION

In the processing of vinyl halide resins and more particularly polyvinyl chloride resins (hereafter PVC) to form moldable or extrudable compositions it is customary to incorporate into the polymeric resin, generally in dry powder form, a variety of additives for special purposes and to achieve the desired processing properties as well as the desired properties in the molded or extruded products. Among the additives generally employed are internal and external lubricants, pigments, heat and light stabilizers, fillers, antioxidants and the like. While the stabilizers generally employed are the liquid organo-tin compounds and while they can be added in liquid form the other additives are for the most part powders or granules. The normally solid additives can be added individually or as mixtures of such powders or granules and incorporated into the resinous polymeric powder in a mixer, typically a high shear mixer, in which the mechanical working of the material causes a rise in the temperature thereof and the additives become molten at temperatures of 100° C. or higher and dispersed at the elevated temperature. For the most part, the normally liquid stabilizer is added to the polymer first and dispersed throughout the polymer at a relatively low temperature. Thereafter, the solid lubricants and waxes are generally added. Normally the lubricants generally include at least one wax that has a sufficiently low melting point to be melted in the mixer and become distributed on the surface of the polymeric powder. Then other additives may generally be added.

It should be recognized that such methodology is subject to a number of disadvantages and drawbacks. For example, numerous separate, time-consuming and error-prone weighings for each additives is required. Moreover, when masterbatching of additives is attempted the difference in physical properties of the various additives has led to inhomogeneity of mixtures thereof. Additionally, such mixtures tend to produce non-uniform agglomerations initially, on storage or when introduced into the mixing apparatus with the polymeric powder. Since some additives are used at low levels of about 0.1 part per hundred parts of resin, phr, this becomes a serious problem.

In attempts to avoid such problems it has been suggested to mix the solid paraffinic hydrocarbon wax, employed as the external lubricant, with the other solid additives, heat the mixture to an elevated temperature of 100° C. or higher and thereafter cooling to recover a solid glass-like friable composition to be added to the polymer. However, this process still leads to an undesirable solid which has to be mixed with the polymeric powder along with all the problems that entails. Another less than satisfactory suggestion has been to form an aqueous emulsion of lubricants and stabilizers which is then mixed with solid additive to form a free-flowing additive concentrate powder. However, this process also results in an undesirable solid powder to be added to the polymeric powder. Also, attempts to add the additives in a molten state at elevated temperatures has been suggested but this has not really solved any of the problems.

It would be highly desirable to be able to incorporate all such additives as a liquid formulation. However, prior hereto no such acceptable method has been found. It is therefore an object of this invention to provide a liquid lubricating and stabilizing composition which is a liquid at normal ambient room temperature or a temperature of 50° C. or less and thus substantially avoid or eliminate the problems associated with the mixing of solid additives to resin powders.

For the most part the industry has employed solid waxes, generally natural or synthetic hydrocarbon paraffin waxes having a melting point of 160° F. or more, as one of the external lubricants necessary to provide the resin composition with improved processing properties, such as fusion time, mold release characteristics and the like. It has been suggested that low molecular weight mineral oils having a low viscosity in the range of about 100 to 150 SSU or less at 100° F. can also be employed along with the solid paraffinic hydrocarbon waxes as an innocuous additional external lubricant. However, the industry has considered any substantial use of such mineral oil as an additional lubricant component to be generally undesirable except in quantities of no more than about 1½% by weight based on the weight of resin. Use of amounts above this level have been considered unacceptable and undesirable and thus have been rigidly avoided since it was thought that the mineral oil was generally incompatible with the resin and amounts greater than this would lead to overlubrication and consequent diminution of both the processing properties of the resin composition and the properties of the products resulting therefrom. Thus, for these and other reasons only low molecular weight, low viscosity mineral oils in amounts of 1.5% by weight or less have been employed in rigid PVC compositions heretofore.

SUMMARY OF THIS INVENTION

Quite surprisingly and contrary to all expectations it has been discovered that one can employ oils essentially derived from petroleum and which are liquids at normal ambient room temperature as substantially the only necessary external lubricant additive for rigid vinyl halide resin compositions if these oils are employed in sufficient quantity. Even more surprisingly it has been discovered that liquid lubricating and stabilizing compositions can be produced employing sufficient quantity of said liquid petroleum oils and that said lubricating and stabilizing compositions are liquids at normally ambient room temperature or at a temperature of about 50° C. or less. Preferable are those compositions which are liquids at normally ambient room temperature. Thus, liquid lubricant and stabilizing compositions can be prepared and stored for use at a later times, which compositions are and remain liquids at normal ambient room temperatures. Such discovery solves the problems and many of the disadvantages and drawbacks associated with the manufacture and use of solid lubricating and stabilizing compositions. This invention also enables one to substantially reduce the manufacturing costs normally associated with the manufacture and packaging of solid lubricating and stabilizing compositions. Also, this invention enables one to simply meter, by volume, the lubricating and stabilizing compositions which operation is much simpler than multiple weighings for solid stabilizer compositions. Additionally one is able to eliminate the use and cost of cooling, spraying, flaking and solids handling equipment associated with manufacture of solid compositions. Moreover, the liquid lubricating and stabilizing compositions of this invention produce products with improved and more uniform appearance.

DETAILED DESCRIPTION OF THE INVENTION

The oils derived essentially from petroleum which may be employed according to this invention are aromatic, naphthenic, paraffinic, extracted naphthenic and extracted paraffinic oils which are liquids at ambient room temperature and meet the molecular weight/percent paraffin content criteria described hereinafter. The oils useful in this invention, in addition to being essentially derived from petroleum and being liquids at ambient room temperature, must be within a specified criteria based on the molecular weight and percent paraffin content of the oils. That is, the oils must have a molecular weight and percent paraffin content sufficient to satisfy the following formula:

(molecular weight)$\times$(% paraffin content)$\times(10^{-4}) \geq$ about 2.0

The viscosity of such oils which meet the hereinbefore described criteria can range, for example, from about 50 to about 8000 SSU at 100° F. More preferably, the oils are those having a viscosity of from about 100 to about 750 SSU at 100° F., and even more preferable are those oils having a viscosity of at least 300 SSU at 100° F. Most preferable is an oil having a viscosity of about 575 SSU or more at 100° F.

In general the lower the viscosity and the lower the molecular weight/percent paraffin content criteria value of the oil employed the greater the amount of oil that must be employed in order for the oil to function as substantially the only necessary external lubricant additive in vinyl halide resin compositions. For example, oils having a viscosity of from about 100 to about 300 SSU are employed in an amount of from about 2% to about 3% or more by weight based on the weight of the resin, with the amount required being generally inversely proportional to the viscosity of the oil. That is, an oil having a viscosity of about 100 SSU is employed in an amount of about 3% or more whereas an oil having a viscosity of about 300 SSU can be employed in an amount down to about 2% or more by weight. Oils having a viscosity of greater than 300 SSU need only be employed in an amount of from about 2% or less, generally down to about 0.5% by weight. That is, an oil having a viscosity of about 575 SSU need only be employed in an amount of about 0.5% to about 2.0% by weight, preferably about 1.175% by weight. Again the amount of oil required is generally inversely proportional to the viscosity of the oil, with the heavier viscosity oils requiring smaller minimum amounts than oils of lesser viscosity.

Such liquid aromatic as well as straight-run and extracted paraffinic and naphthenic oils that may be used according to this invention are generally available commercially. As examples of such oils meeting the criteria for use in this invention, there may be mentioned, for example, commercially available oils having the following molecular weights and percents paraffin:

TABLE 1

| Oil | Molecular Weight (MW) | % Paraffin | MW $\times$ % Paraffin $\times$ $10^{-4}$ |
|-----|------------------------|-----------|-------------------------------------------|
| A | 590 | 60 | 3.54 |
| B | 370 | 60 | 2.22 |
| C | 455 | 60 | 2.73 |
| D | 800 | 52 | 2.31 |
| E | 680 | 60 | 4.08 |
| F | 695 | 59 | 4.10 |
| G | 725 | 61 | 4.42 |
| H | 720 | 68 | 4.89 |
| I | 430 | 57 | 2.45 |
| J | 610 | 40 | 2.44 |
| K | 370 | 67 | 2.48 |
| L | 400 | 68 | 2.72 |
| M | 440 | 68 | 2.99 |
| N | 475 | 69 | 3.78 |
| O | 530 | 72 | 3.82 |
| P | 580 | 71 | 4.12 |
| Q | 650 | 71 | 4.62 |
| R | 720 | 71 | 5.11 |
| S | 320 | 63 | 2.02 |
| T | 440 | 66 | 2.90 |
| U | 350 | 62 | 2.17 |
| V | 400 | 56 | 2.24 |
| W | 445 | 64 | 2.85 |
| X | 520 | 65 | 3.38 |
| Y | 575 | 62 | 3.57 |
| Z | 680 | 67 | 4.56 |

Especially preferred is an extracted paraffinic oil having a viscosity of about 575 SSU at 100° F.

The liquid oils useful in this invention can be added to rigid vinyl halide resin compositions alone or combined with other processing, stabilizing and processing additives. In either case, when these liquids oils are employed in sufficient quantity the oils can function as substantially the only necessary external lubricant required to provide satisfactory molding and extrusion properties of the resulting resin compositions. It will be appreciated, however, that other external lubricants, both solid and liquid, can be added if desired.

A further and important aspect of this invention is the discovery that such oils can be employed along with one or more other processing and formulation additives for vinyl halide resins such as liquid heat stabilizers and internal lubricants as well as metal release, fusion time regulators, melt viscosity control agents and the like and that the lubricating and stabilizing compositions resulting are liquids at normal ambient room temperature or at temperatures of about 50° C. or less.

The oils of this invention can be combined with liquid vinyl halide resin heat stabilizers such as liquid organo-tin or antimony heat stabilizers generally known in the art. While any suitable liquid organo-tin and antimony vinyl halide resin stabilizer can be employed it is preferred to employ organo-tin mercapto carboxylic acid esters and organo-tin carboxylic acid mercapto alcohol esters, such as those disclosed for example in U.S. Pat. Nos. 2,753,325 to Leistner et al., issued June 26, 1953; 2,641,596 to Leistner et al., issued June 9, 1953; 2,648,650 to Weinberg et al., issued Aug. 11, 1953; and 4,002,881 to Kugele, issued Dec. 13, 1977. Especially preferred for use as liquid organo-tin stabilizer are dibutyl tin bis(isooctyl thioglycolate), mono- and di-methyl tin bis(2 mercaptoethyl oleate), mono- and di-methyl tin bis(2 mercaptoethyl laurate) and the like. As examples of suitable liquid antimony vinyl halide stabilizers there can be mentioned antimony tris(isooctyl thioglycolate), antimony tris(beta mercaptopropionate) and the like. Mixtures of such liquid stabilizers may also be employed.

When the oils of this invention are combined with liquid vinyl halide heat stabilizers to produce liquid lubricating and stabilizing compositions which are liquids at normal ambient room temperature or at a temperature of about 50° C. or less the composition will generally comprise from about 0.5 to about 5.0 parts by weight oil and from about 0.1 to about 1.0 part by weight heat stabilizer compound. Generally from about 2.0 to about 4.0 parts by weight, preferable about 3.0 parts, of such liquid lubricating and stabilizing composition per hundred parts of resin are added to rigid vinyl halide resin to produce acceptable moldable and extrudable resin composition.

In an even further aspect of this invention, a liquid lubricating and stabilizing composition which is liquid at ambient room temperature contains not only the hereinbefore described oils as substantially the only necessary external lubricant and the liquid vinyl halide heat stabilizers but also contains metal salt internal lubricants and stabilizers and oxidized polyolefin wax as processing additives.

As examples of metal salt internal lubricants and stabilizers there may be employed calcium, magnesium, zinc, barium and strontium salts of acids selected from tall oil acid, rosin acid, unsaturated fatty acids, saturated neo fatty acids and naphthenic acids. As unsaturated fatty acids salts especially useful in this invention there can be mentioned, for example, salts of oleic, linoleic, linolenic, erucic, ricinoleic and brassidic acids. Especially preferred are calcium salts, especially calcium tallate, calcium rosinate, calcium oleate, calcium naphthenate and calcium neodecanoate. It is understood that mixtures of one or more salts may also be employed. When added to the liquid lubricating and stabilizing compositions of this invention containing the liquid oil and liquid heat stabilizer the metal salts are generally employed in an amount of from about 0.15 to about 1.0 parts by weight, most preferably from about 0.3 to about 0.4 parts by weight.

As examples of oxidized polyolefins that may be employed in the compositions of this invention there can be mentioned, for example, oxidized polyolefins of olefins containing from 2 to 8 carbons atoms and particularly oxidized polyethylenes such as AC 629A, available from Allied Corp. When employed in the liquid lubricating and stabilizing compositions of this invention the oxidized polyolefin is present in an amount of from about 0.0 to about 0.3 parts by weight, most preferably about 0.125 parts by weight.

The liquid lubricating and stabilizing compositions of this invention can be prepared by mixing the appropriate amount of liquid oil and liquid heat stabilizer. When the liquid lubricating and stabilizing compositions are to include the metal salts and oxidized polyolefin components, these components are generally first mixed with the liquid oil and the mixture heated by any suitable means to a temperature sufficient to melt the additives, generally about 175° F., and mixed to provide a homogeneous liquid mixture. After the homogeneous liquid mixture is cooled the liquid heat stabilizer may be added to the composition with suitable mixing to provide a homogeneous liquid lubricating and stabilizing composition which is and remains a liquid at normal ambient room temperature or at a temperature of about 50° C. or less.

The metal salt component of the liquid lubricant and stabilizing compositions of this invention may be added to the liquid oils as such or may be formed in situ by adding the appropriate amount of acid and metal hydroxide, such as hydrated lime. When the metal salt is formed in situ it is preferred that a slight stoichiometric excess of acid be added so that the resulting composition contains some free acid, such as for example, up to about 0.1 parts by weight free acid. The free acid appear to be required in certain cases in which the metal salt is formed in situ to prevent gelation of the resulting normally liquid lubricating and stabilizing composition. If desired, up to about 0.1 part by weight of free acid could also be added to the stabilizing compositions when the preformed metal salt is added rather than being formed in situ.

Once produced, these liquid lubricating and stabilizing compositions remain liquid at normal ambient room temperature or a temperature of about 50° C. or less even on storage over extended periods of time. As such they can be added to rigid polyvinyl halide resins at much lower processing and mixing temperatures than heretofore possible. These lower mixing temperatures greatly improve the internal flow characteristics of the resulting resin compositions, and reduce the tendency of the compositions to stick to processing equipment. Additionally, one is able to obtain finished molded or extruded products having improved surface smoothness. Moreover, the fact that essentially all the additives normally required to obtain suitable processing properties for rigid vinyl halide resins are now present in a single liquid lubricating and stabilizing composition eliminates the numerous problems and disadvantages mentioned hereinbefore with respect to the addition of normally solid additives to such rigid vinyl halide resin formulations.

Generally from about 2 to about 6 parts by weight of the liquid lubricating and stabilizing compositions of this invention containing metal salts and oxidized polyolefins, per hundred part by weight of resin, may be added to rigid vinyl halide resins. Even more preferably about 2.5 to about 4.0 parts and most preferably about 3.0 parts by weight of said liquid lubricating and stabilizing compositions are added to vinyl halide resins.

The liquid lubricating and stabilizing composition of this invention are of particular usefulness in the lubrication and stabilization of rigid vinyl halide resins, especially polyvinyl chloride resins, that are formulated to withstand temperatures of at least about 175° C. Such rigid resin compositions may be used to produce pipes, fittings, connections, tubes and the like. The vinyl halide resins that may be included in the lubricated and stabilized resinous compositions of this invention include both vinyl halide homopolymers, such as polyvinyl chloride, polyvinyl bromine, and polyvinylidene chloride, and copolymers formed by the polymerization of a vinyl halide with up to about 30 percent of a comonomer, such as vinyl acetate, vinyl propionate, vinyl butyrate, vinylidene chloride, styrene, ethylene, propylene, ethyl acrylate, methyl methacrylate, acrylic acid, and the like. The invention is also applicable to mixtures containing a major proportion of a vinyl halide resin and a minor proportion of another synthetic resin, such as chlorinated polyethylene, polyacrylate resins, polymethacrylate esters, polyacrylonitrile, and terpolymers of acrylonitrile, butadiene, and styrene.

In addition to the aforementioned ingredients, the lubricated and stabilized resin compositions may have added thereto other customary vinyl halide resin additives, if desired, such as pigments, dyes, other processing aids, fillers, impact modifiers, extenders and the like in amounts normally employed for the purposes indicated.

It has been found generally necessary for a rigid vinyl halide resin formulation to have a fusion time (the time between formulation loading and the time of development of maximum torque after compaction) of at least about a minute and a half or more in order to provide for satisfactory processing of such a vinyl halide resin formulation. It is considered necessary to delay fusion time of such a rigid polymer formulation for a period of at least about 1½ minutes or more in order to sufficiently reduce shear heating of the polymer formulation during processing. If the polymer formulation does not have such a delayed fusion time, increased shear heating of the polymer occurs during processing and the polymer tends to burn.

External lubricants are employed for, among other reasons, the purpose of sufficiently delaying fusion time of such polymer formulations. The use of the oils of this invention as the only necessary external lubricant for rigid PVC resin compositions provides typical external lubrication efficiency, that is, acceptable fusion delaying properties. However, liquid oils not meeting the criteria of the invention, namely:

(molecular weight)×(% paraffin content)×$(10^{-4})\geq2.0$ do not provide such fusion delaying properties and therefore cannot be employed as the only necessary external lubricant.

It has also been discovered that the use of the oils of this invention provide excellent external lubricant activity and delay fusion of the resin formulations more effectively with increasing use level.

For purposes of illustrating the invention the following examples are set forth as exemplary of the use of the oils of this invention as the only necessary external lubricant additive and of liquid lubricating and stabilizing compositions of this invention and their use in vinyl halide resin compositions.

EXAMPLE 1

The beneficial use of oils of this invention as the only necessary external lubricant additive is illustrated by the incorporation of various liquid oils into rigid PVC formulations and observing the fusion delaying effects obtained. Resin formulations were prepared by blending to 110° C. in a Henschel high intensity mixer (model 2 JSS) 100 parts by weight polyvinyl chloride resin (Geon 103 EP available from B. F. Goodrich Chemical Co.) with 3 parts fine particle size calcium carbonate filler, 0.60 part calcium stearate internal lubricant, 1.0 part titanium dioxide, 0.15 part of an oxidized low molecular weight ethylene homopolymer (AC 629 A available from Allied Corporation), and 0.4 part organotin heat stabilizer (Advastab TM-694 available from the Carstab division of Morton Thiokol, Inc.). Each of the liquid oils essentially derived from petroleum listed in Table A and in the amounts indicated in said Table A, were in turn mixed with the resin formulations. Amounts stated are parts by weight oil per hundred parts polyvinyl chloride.

Fusion time properties of the formulations during processing were determined by working 68 grams of each formulation in a Brabender Plasticorder using a No. 6 mixing head, oil heated, with roller type blades. Oil temperature was maintained at 190° C. and the blade was run at 60 rpm. Fusion time was measured as the time between formulation loading and the time of development of maximum torque after compaction.

The results of said Brabender fusion time testing wer as follows:

TABLE A

| Oil* - Amount | | MW × % Paraffin × $10^{-4}$ value | Fusion Time (minutes) |
|---|---|---|---|
| B | 1 phr | 2.22 | 0.9 |
|   | 2 phr |      | 0.9 |
|   | 3 phr |      | 1.6 |
| C | 1 phr | 2.73 | 0.6 |
|   | 2 phr |      | 1.3 |
|   | 3 phr |      | 2.6 |
| E | 1 phr | 4.08 | 1.2 |
|   | 2 phr |      | 3.8 |
|   | 3 phr |      | 5.2 |
| I | 1 phr | 2.45 | 0.6 |
|   | 2 phr |      | 1.2 |
|   | 3 phr |      | 2.6 |
| A | 1 phr | 3.54 | 0.8 |
|   | 2 phr |      | 1.9 |
|   | 3 phr |      | 4.0 |

*From Table 1

For each of the tested oils of the invention, acceptable fusion delaying properties were obtained by use of the appropriate amount of the oil in the resin formulation.

EXAMPLE 2

Comparative

In a manner identical to Example 1, liquid oils not meeting the hereinbefore mentioned criteria formula of this invention were employed in otherwise identical resin formulation and their fusion delaying properties observed as set forth in Table B.

TABLE B

| Oil - Amount | | MW × % Paraffin × $10^{-4}$ value | Fusion Time (minutes) |
|---|---|---|---|
| 1 | 1 phr | 1.40 | 0.5 |
|   | 2 phr |      | 0.6 |
|   | 3 phr |      | 0.7 |
| 2 | 1 phr | 1.72 | 0.5 |
|   | 2 phr |      | 0.5 |
|   | 3 phr |      | 0.7 |
| 3 | 1 phr | 0.66 | 0.4 |
|   | 2 phr |      | 0.4 |
|   | 3 phr |      | 0.4 |
| 4 | 1 phr | 1.28 | 0.4 |
|   | 2 phr |      | 0.5 |
|   | 3 phr |      | 0.5 |
| 5 | 1 phr | 0.34 | 0.3 |
|   | 2 phr |      | 0.4 |
|   | 3 phr |      | 0.3 |
| 6 | 1 phr | 1.02 | 0.3 |
|   | 2 phr |      | 0.4 |
|   | 3 phr |      | 0.4 |

None of these oils produced acceptable fusion delaying properties at any tested level and thus cannot be employed as the only necessary external lubricants in rigid vinyl halide formulations.

The liquid oils of this invention may therefore be employed to provide liquid lubricating and stabilizing compositions for addition to rigid vinyl halide resins to eliminate or substantially avoid the problems encountered with the previous use of solid or combined solid-liquid lubricating and stabilizing compositions.

EXAMPLE 3

As examples of liquid lubricating and stabilizing compositions of this invention, for addition to rigid PVC formulations, reference may be had to compositions I through IX set forth in Table C.

TABLE C

| Component | \multicolumn{9}{c}{Compositions} |
| | I | II | III | IV | V | VI | VII | VIII | IX |
| | \multicolumn{9}{c}{parts by weight} |
|---|---|---|---|---|---|---|---|---|---|
| Oil A | 1.175 | 1.175 | 1.787 | 1.125 | 1.175 | 1.175 | 1.125 | 1.125 | |
| Oil B | | | | | | | | | 3.00 |
| Calcium rosinate | .204 | | | | | | | | |
| Calcium naphthenate | | .32 | | | | | | | |
| Calcium oleate | | | .43 | | | | | | .46 |
| Calcium neodecanoate | | | | .32 | | | | | |
| Magnesium rosinate | | | | | .32 | | | | |
| Barium rosinate | | | | | | .32 | | | |
| Strontium rosinate | | | | | | | .32 | | |
| Zinc rosinate | | | | | | | | .32 | |
| Rosin acid | .188 | | | | .10 | .10 | .10 | .10 | |
| Naphthenic acid | | .10 | | | | | | | |
| Oleic acid | | | .043 | | | | | | .10 |
| Neodecanoic acid | | | | .20 | | | | | |
| Oxidized polyethylene | .125 | .125 | .125 | .125 | .125 | .125 | .125 | .125 | .125 |
| TM-694 organotin stabilizer | .40 | .40 | .40 | .40 | .40 | .40 | .40 | .40 | .40 |

Addition of exemplary liquid Composition I through IX to a rigid PVC formulation of 100 parts by weight polyvinyl chloride (Geon 103 EP available from B. F. Goodrich Chemical Co.), 3 phr calcium carbonate filler and 1 phr titanium dioxide provides acceptable lubricated, stabilized PVC resin formulations processing desired delayed fusion time characteristics.

What is claimed is:

1. In a process for adding to rigid vinyl halide resin one or more processing, stabilizing and formulation additives the improvement comprising adding to the resin as substantially the only necessary external lubricant additive an oil derived essentially from petroleum, which oil is liquid at ambient room temperature and meets the criteria:

$$(\text{molecular weight}) \times (\% \text{ paraffin content}) \times (10^{-4}) \geq 2.0,$$

said oil being added to the resin in an amount sufficient to produce the external lubrication properties necessary to permit satisfactory molding and extrusion of the resulting resin composition.

2. The process of claim 1 in which the external lubricant additive is an oil having a viscosity of at least 300 SSU at 100° F.

3. The process of claim 1 in which the external lubricant oil is an oil having a viscosity of at least about 575 SSU at 100° F.

4. The process of claim 1 in which the external lubricant oil is an oil having a viscosity of from 50 SSU to about 300 SSU at 100° F. and is added to the resin in an amount up to about 5% by weight based on the weight of resin.

5. The process of claim 3 in which the amount of lubricant added to the resin is an amount of from about 0.5% to about 2.0% by weight based on the weight of resin.

6. A rigid vinyl halide resin molding and extrusion composition containing one or more processing and formulation additives wherein substantially the only necessary external lubricant additive present in the composition consists of an oil derived essentially from petroleum, which oil is a liquid at ambient room temperature and meets the criteria:

$$(\text{molecular weight}) \times (\% \text{ paraffin content}) \times (10^{-4}) \geq 2.0,$$

said oil being present in an amount sufficient to produce the external lubrication properties necessary to permit satisfactory molding and extrusion of the resin composition.

7. The resin composition of claim 6 in which the external lubricant additive is an oil having a viscosity of at least 300 SSU at 100° F.

8. The resin composition of claim 6 in which the external lubricant oil is an oil having a viscosity of at least about 575 SSU at 100° F.

9. The resin composition of claim 6 in which the external lubricant oil is an oil having a viscosity of from 50 SSU to about 300 SSU at 100° F. an in added to the resin in an amount up to about 5% by weight based on the weight of resin.

10. The resin composition of claim 8 in which the amount of lubricant added to the resin is an amount of from about 0.5% to about 2.0% by weight based on the weight of resin.

11. A liquid lubricating and stabilizing composition for addition to rigid vinyl halide resin, which composition is liquid at a temperature of about 50° C. or less, said composition comprising:

(a) as substantially the only necessary external lubricant additive of said composition, an oil derived essentially from petroleum, which oil is liquid at ambient room temperature and meets the criteria:

$$(\text{molecular weight}) \times (\% \text{ paraffin content}) \times (10^{-4}) \geq 2.0$$

and (b) a liquid vinyl halide heat stabilizer; the composition comprising from about 0.5 to about 5.0 parts by weight of said oil and from about 0.1 to about 1.0 parts by weight of said liquid heat stabilizer.

12. A liquid lubricating and stabilizing composition of claim 11 in which said composition is a liquid at ambient room temperature.

13. A liquid lubricating and stabilizing composition of claim 11 additionally containing as stabilizer and internal lubricant additives:
 (c) from about 0.15 to about 1.0 parts by weight of a metal salt of acids selected from the group consisting of tall oil acid, rosin acid, unsaturated fatty acids, saturated neo fatty acids and naphthenic acids, and wherein the metal is selected from the group consisting of calcium, magnesium, zinc, barium and strontium, and
 (d) from about 0 to about 0.3 parts by weight of an oxidized polyolefin wax in which the olefin contains from 2 to 8 carbon atoms.

14. A liquid lubricating and stabilizing composition of claim 12 additionally containing as stabilizer and internal lubricant additives:
 (c) from about 0.15 to about 1.0 parts by weight of a metal salt of acids selected from the group consisting of tall oil acid, rosin acid, unsaturated fatty acids, saturated neo fatty acids and naphthenic acids, and wherein the metal is selected from the group consisting of calcium, magnesium, zinc, barium and strontium, and
 (d) from about 0 to about 0.3 parts by weight of an oxidized polyolefin wax in which the olefin contains from 2 to 8 carbon atoms.

15. A liquid lubricating and stabilizing composition of claim 12 in which the oil is an oil having a viscosity of at least 300 SSU at 100° F. and is present in an amount of from about 0.5 to about 3.0 parts by weight.

16. A liquid lubricating and stabilizing composition of claim 12 in which the oil is an oil having a viscosity of at least about 575 SSU at 100° F. and is present in an amount of from about 0.5 to about 2.0 parts by weight.

17. A liquid lubricating and stabilizing composition of claim 14 in which the oil is an oil having a viscosity of at least 300 SSU at 100° F. and is present in an amount of from about 0.5 to about 3.0 parts by weight.

18. A liquid lubricating and stabilizing composition of claim 14 in which the oil is an oil having a viscosity of at least about 575 SSU at 100° F. and is present in an amount of from about 0.5 to about 2.0 parts by weight.

19. A rigid vinyl halide resin composition comprising vinyl halide resin and a liquid lubricating and stabilizing composition of claim 11, said liquid lubricating and stabilizing composition being present in an amount of from about 2.0 to about 4.0 parts by weight per hundred parts of vinyl halide resin.

20. A rigid vinyl halide resin composition comprising vinyl halide resin and a liquid lubricating and stabilizing composition of claim 12, said liquid lubricating and stabilizing composition being present in an amount of from about 2.0 to about 4.0 parts by weight per hundred parts of vinyl halide resin.

21. A rigid vinyl halide resin composition comprising vinyl halide resin and a liquid lubricating and stabilizing composition of claim 13, said liquid lubricating and stabilizing composition being present in an amount of from about 2.0 to about 6.0 parts by weight per hundred parts of vinyl halide resin.

22. A rigid vinyl halide resin composition comprising vinyl halide resin and a liquid lubricating and stabilizing composition of claim 14, said liquid lubricating and stabilizing composition being present in an amount of from about 2.0 to about 6.0 parts by weight per hundred parts of vinyl halide resin.

23. A rigid vinyl halide resin composition comprising vinyl halide resin and a liquid lubricating and stabilizing composition of claim 15, said liquid lubricating and stabilizing composition being present in an amount of from about 2.0 to about 4.0 parts by weight per hundred parts of vinyl halide resin.

24. A rigid vinyl halide resin composition comprising vinyl halide resin and a liquid lubricating and stabilizing composition of claim 16, said liquid lubricating and stabilizing composition being present in an amount of from about 2.0 to about 4.0 parts by weight per hundred parts of vinyl halide resin.

25. A rigid vinyl halide resin composition comprising vinyl halide resin and a liquid lubricating and stabilizing composition of claim 17, said liquid lubricating and stabilizing composition being present in an amount of from about 2.0 to about 6.0 parts by weight per hundred parts of vinyl halide resin.

26. A rigid vinyl halide resin composition comprising vinyl halide resin and a liquid lubricating and stabilizing composition of claim 18, said liquid lubricating and stabilizing composition being present in an amount of from about 2.0 to about 6.0 parts by weight per hundred parts of vinyl halide resin.

27. A liquid lubricating and stabilizing composition of claim 14 comprising:
 (1) from about 1.175 parts by weight of an oil having a viscosity of about 575 SSU at 100° F.,
 (2) about 0.4 parts by weight of an organo-tin stabilizer,
 (3) about 0.45 parts by weight of calcium salt selected from the group consisting of calcium tallate, calcium rosinate, calcium naphthenate, calcium oleate and calcium neodecanate, and
 (4) about 0.125 parts by weight of oxidized polyethylene wax.

28. A rigid vinyl halide resin composition comprising a vinyl halide resin and, from about 2.0 to about 6.0 parts by weight per hundred parts of resin of a liquid lubricating and stabilizing composition of claim 27.

29. A liquid lubricating and stabilizing composition of claim 13 wherein the metal salt is formed in-situ and there is present in the composition up to about 0.1 part by weight of free acid.

30. A liquid lubricating and stabilizing composition of claim 14 wherein the metal salt is formed in-situ and there is present in the composition up to about 0.1 part by weight of free acid.

31. A liquid lubricating and stabilizing composition of claim 27 containing 0.1 part by weight free acid of the acid from which the calcium salt is formed.

32. A rigid vinyl halide resin composition comprising a vinyl halide resin and, from about 2.0 to about 6.0 parts by weight per hundred parts of resin of a liquid lubricating and stabilizing composition of claim 31.

* * * * *